Feb. 27, 1951 A. MACKMANN 2,543,117
POSITIVE DRIVE GEAR CHUCK
Filed March 17, 1947 4 Sheets-Sheet 4

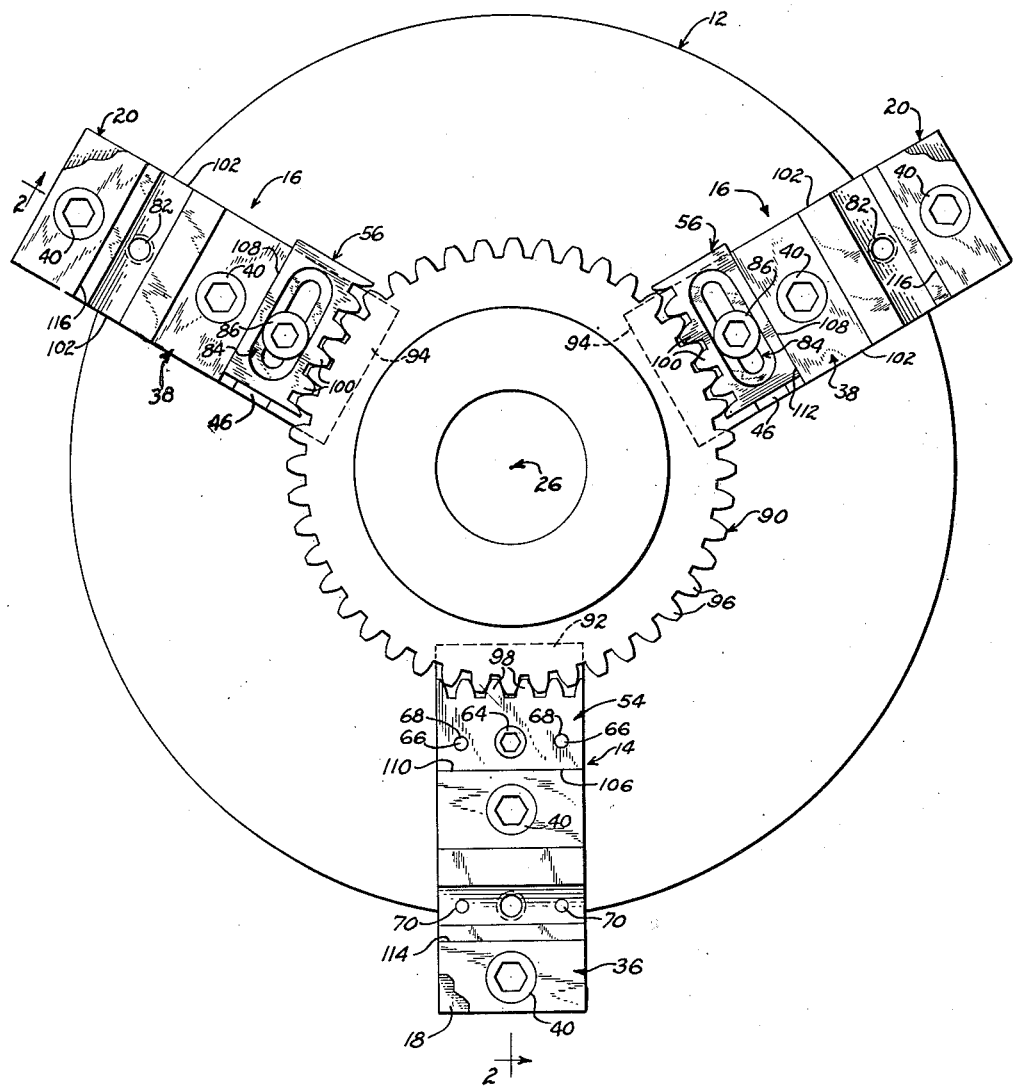

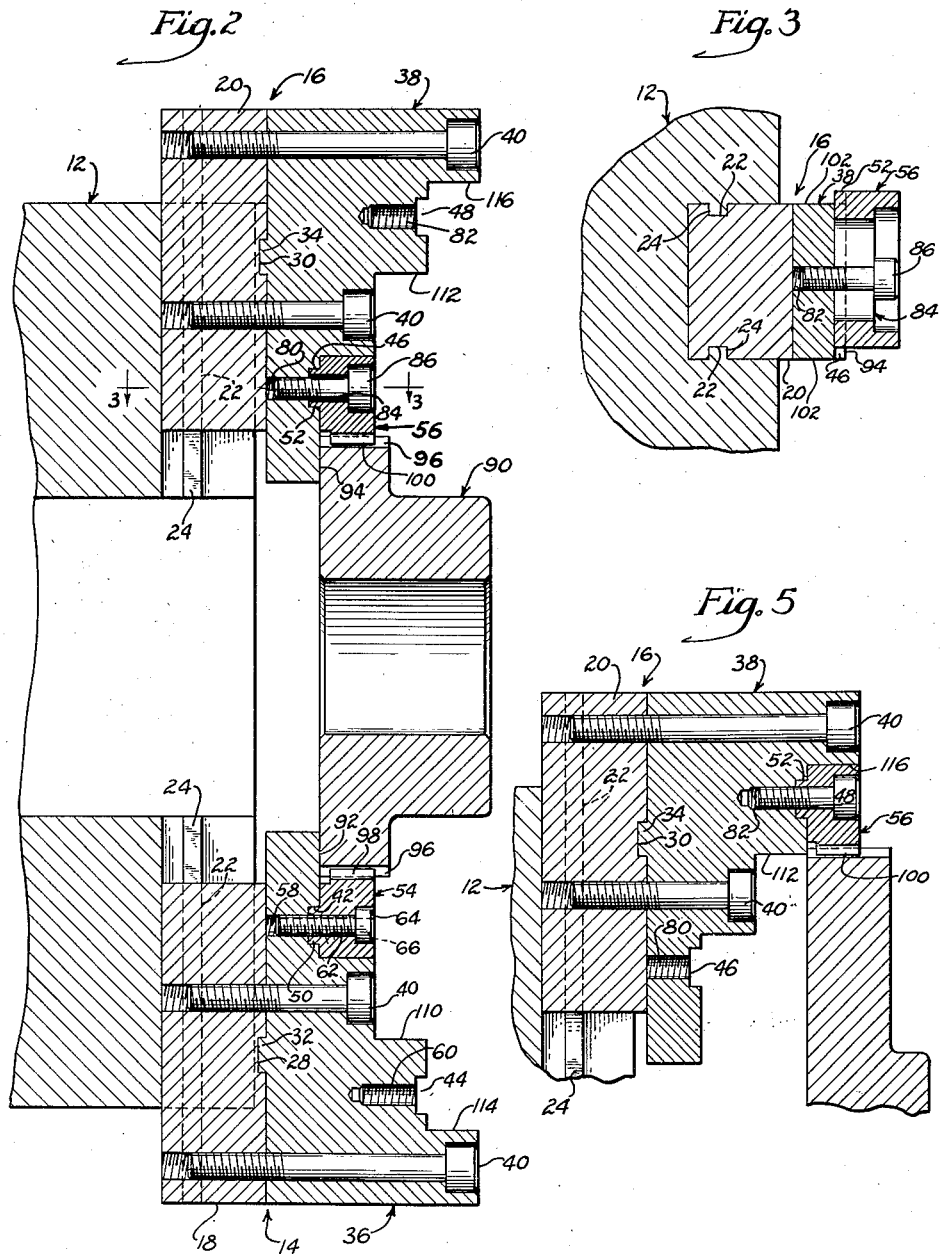

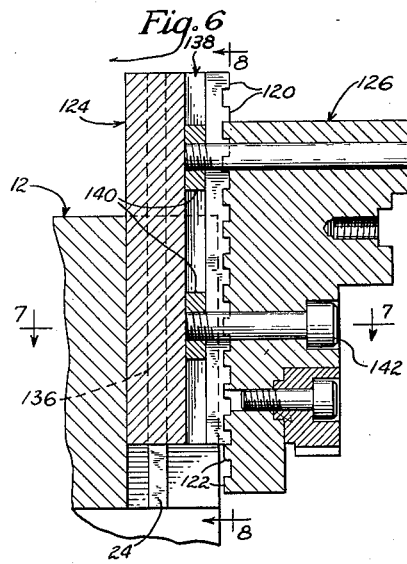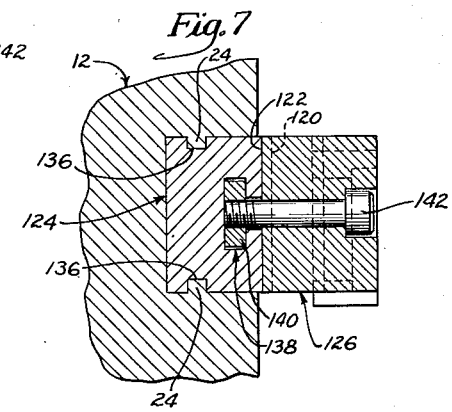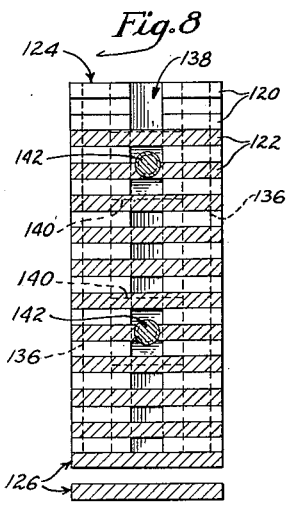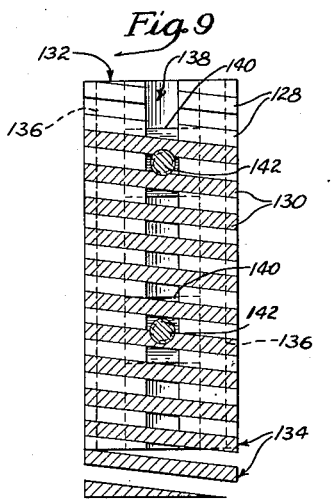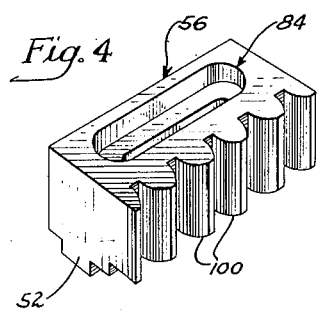

INVENTOR.
Arthur Mackmann
BY
Louis Sheldon
Atty.

Patented Feb. 27, 1951

2,543,117

UNITED STATES PATENT OFFICE 2,543,117

POSITIVE DRIVE GEAR CHUCK

Arthur Mackmann, Chicago, Ill.

Application March 17, 1947, Serial No. 735,181

12 Claims. (Cl. 279—1)

This invention relates to gear and sprocket chucks. For convenience, the word "gear" as used hereinafter is to be understood as including sprockets, where the context permits.

It is an object of my invention to provide, in a positive drive gear chuck, means for gripping and centralizing gears regardless whether or not the number of gear teeth is divisible by the number of jaws.

Another object is to provide a positive drive gear chuck with self-adjusting jaws capable of properly accommodating and clamping gears regardless whether or not the number of gear teeth is divisible by the number of jaws or the gears are inaccurately made within manufacturing tolerances.

Another object is to provide an adjustable positive drive gear chuck having a range at least equal to that of conventional stepped jaw chucks.

A further object is to provide a gear chuck constructed to grip spur and helical gears and silent chain sprockets at the pitch lines thereof and roller chain sprockets at the root diameters thereof.

An additional object is to provide a compensating replaceable jaw to fit any standard or universal scroll or cam type operated replaceable jaw chuck.

In the past it has been the practice to chuck on the outer periphery of a gear or sprocket with jaws machined to the required diameter in each case, or to insert so-called pitch pins to insure concentricity with the pitch cylinders of gears and silent chain sprockets or the root cylinders of roller chain sprockets, as the case may be. When pitch pins are used, it is customary to select pins of such size that they project slightly outside of the outer periphery of the gear teeth, the chuck jaws thus having only line contact with the pins. This method of gear chucking is very unsatisfactory, yet is the most widely used today. In cases of heavy machining operations it is necessary to provide additional clamping means to prevent slipping of the pins in the jaws. Moreover, this method cannot be used on roller chain sprockets because the standard pin diameter is equal to the chain roller diameter and hence the pins do not project radially outward beyond the outer periphery of the sprocket teeth, so that the pins cannot be gripped by the standard chuck jaws.

The foregoing disadvantages of the present practices are overcome by my invention.

Further objects and advantages of the invention will appear as the description proceeds.

The invention will be better understood upon reference to the following description and accompanying drawings, in which:

Fig. 1 is a front elevational view of a gear chuck constructed in accordance with one form of my invention.

Fig. 2 is a sectional view taken as indicated by the line 2—2 in Fig. 1.

Fig. 3 is a sectional view taken as indicated by the line 3—3 in Fig. 2.

Fig. 4 is an isometric view of a compensating rack insert forming a part of my invention.

Fig. 5 is a sectional view similar to the upper part of Fig. 2 but showing the parts in a different adjustment to accommodate a larger gear.

Fig. 6 is a fragmentary sectional view similar to the upper part of Fig. 2 but showing a modified form of the invention.

Figure 10:
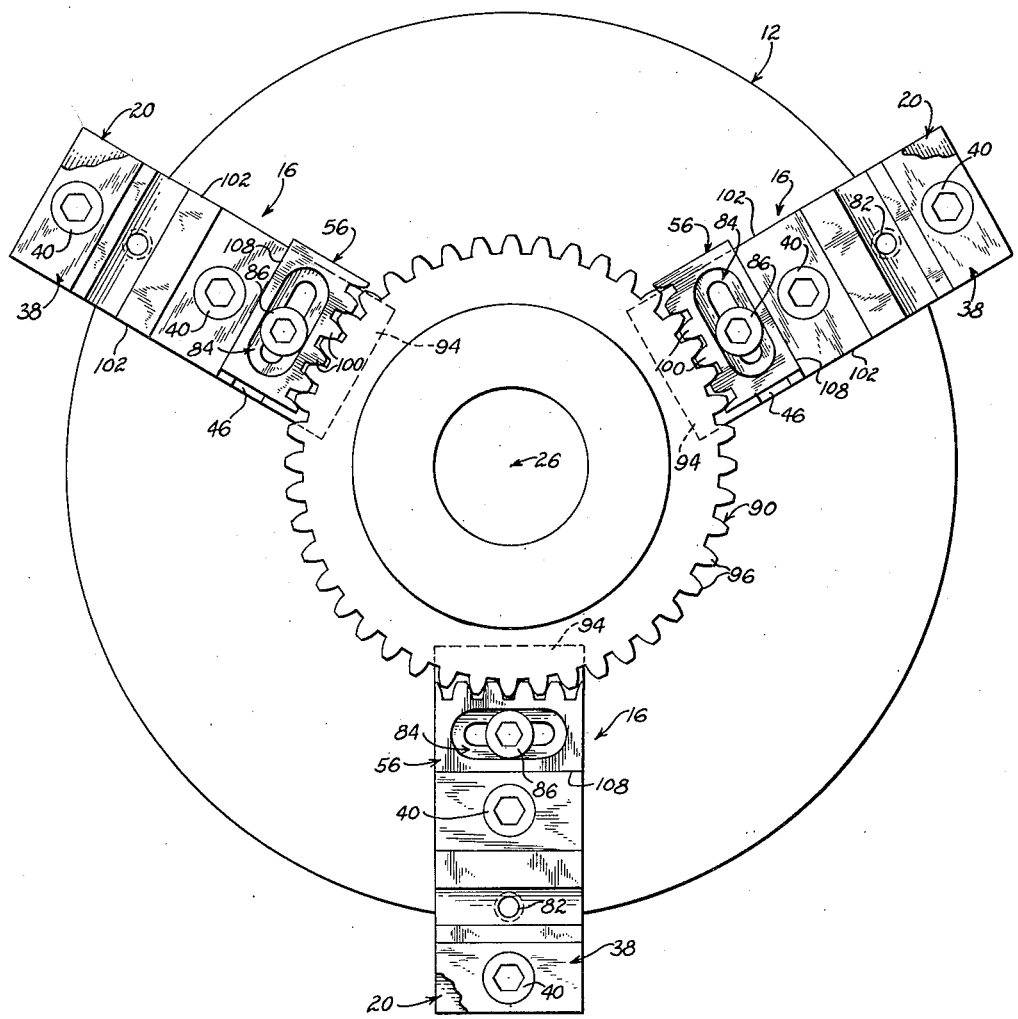

Figs. 7 and 8 are sectional views taken as indicated by the lines 7—7 and 8—8 in Fig. 6

Fig. 9 is a view similar to Fig. 8 but of a somewhat modified construction.

Fig. 10 is similar to Fig. 1 but shows a modified construction.

My invention consists broadly in, among other things, the provision of rack inserts attached to the replaceable jaws of chucking jaw assemblies, the tooth form of each rack insert being identical with the tooth form of the basic rack teeth used in generating the gear or sprocket teeth, except that the teeth of each insert are of slightly less depth than the teeth of the gear or silent chain sprocket to be clamped thereby and equal to the depth of the hobbed teeth of the roller chain sprocket.

Referring now more particularly to the drawings, showing certain forms of the invention for exemplary purposes only, there appears in Figs. 1 to 5 a chuck face plate 12 which is provided with three chucking jaw assemblies of which one is shown at 14 and the other two at 16, all arranged 120° apart. Some standard chucks employ less or more chucking jaw assemblies, and it is to be understood that the invention is equally applicable to all types. The chucking jaw assemblies 16 are identical with each other but differ from the assembly 14. Each chucking jaw assembly associated with a standard chuck face plate comprises a master jaw and a so-called replaceable jaw. In accordance with my invention a special replaceable jaw is employed although all of the master jaws in any one chuck using my invention may be identical. The master jaw forming a part of the assembly 14 will be numbered differently from the other master jaws for convenience.

Each jaw assembly 14, 16 comprises a master jaw 18, 20, respectively, having the usual side guideways 22 mating with keys 24 on the face plate 12, all of said master jaws being simultaneously adjustable toward and from the axis 26 of the face plate by the usual hydraulic, pneumatic, cam, scroll or other suitable adjusting mechanism, none of which is here shown since it is not specifically a part of my invention. The master jaws 18, 20 have in their front faces straight transverse keyways 28, 30 in which the keys 32, 34 of replaceable jaws 36, 38 respectively are disposed. The replaceable jaws 36 and 38 are removably secured to the respective master jaws 18 and 20 as by socket head screws 40, and are preferably stepped to provide radially spaced parallel slots 42, 44 and 46, 48, respectively, to selectively receive the keys 50, 52 of rack inserts 54, 56 having teeth identical with the tooth form of the basic rack generating the toothed members to be chucked by the inserts, except that the insert teeth are of slightly less depth than the teeth of the gears or silent chain sprockets to be chucked, and of the same depth as the teeth of roller chain sprockets to be chucked.

Substantially centrally of each slot 42, 44 in the replaceable jaw 36 there is a tapped hole 58, 60, respectively, and the rack 54 has a countersunk hole 62 for receiving a screw 64 selectively engageable in one or the other tapped hole, for locking said rack in the respective slot. Removable dowels 66 may be inserted in holes 68, 70, provided therefor in the replaceable jaw 36 and rack 54, respectively. The rack 54 is shown immovably secured in the slot 42, and is capable of being removed therefrom and immovably secured in the slot 44, to accommodate gears of a larger range of diameters, as will appear.

Substantially centrally of each slot 46, 48 in each replaceable jaw 38 of each jaw assembly 16 there is a tapped hole 80, 82, respectively, and the rack 56, which functions as a compensating rack, as will appear, has a countersunk elongated hole 84, parallel to and extending through its key 52 for the reception of a screw 86 selectively receivable in each of said tapped holes, said screw, when loose, allowing the rack to float relative to the replaceable jaw, and, when tight, immovably locking the rack to the replaceable jaw in the desired position of adjustment.

In use, all of the racks are located in the radially inner slots 42 and 46 to accommodate toothed members within a range of relatively small diameters, or are located in the radially outer slots 44 and 48 to accommodate toothed members within a range of relatively large diameters, the distance between such slots in the replaceable jaws corresponding, if desired, with the radial distance between gripping surfaces in conventional chuck replaceable jaws.

When a gear is to be chucked in accordance with my invention, a set of racks 54 and 56 is selected with rack teeth corresponding as noted above to the teeth of the gear, and the racks are mounted in the inner set 42, 46 or the outer set 44, 48, of the replaceable jaws 36, 38, depending on the diameter of the gear. The gear 90, shown by way of example in Figs. 1 and 2, is one adapted to be chucked when the racks 54 and 56 are in their inner positions, as shown. With the racks positioned thus and the compensating racks 56 free to float and the master jaws adjusted radially outward from chucking position, the gear 90 is placed with a face thereof engaging the inner set of work-locating surfaces 92, 94 on the replaceable jaws 36, 38 and with its teeth 96 in mesh with the teeth 98 of the fixed rack insert 54, and then the master jaws 18, 20 are adjusted radially and uniformly inward until the rack teeth 98, 100 at their pitch lines are engaged with the teeth of the gear at its pitch circle. When chucking a gear having a number of teeth divisible by the number of jaw assemblies, pitch line contact between the rack inserts 54, 56 and the gear can occur when the compensating rack inserts 56 are in their neutral positions, which, looking at Fig. 1, would occur when the inserts 56 are flush with the sides 102 of the respective replaceable jaws 38 so that the gear teeth will not cause the floating rack inserts to float, and indeed the floating inserts in such event could be fixed in advance in neutral position. The gear 90 was particularly chosen for illustrative purposes because the number of its teeth is not divisible by the number of jaw assemblies, so that, as the various master jaws are adjusted radially inward, the rack inserts will be shifted in directions parallel to their respective pitch lines by cam action of the insert teeth 100 with the adjacent teeth 96 of the gear until there is perfect insert pitch line and gear pitch circle engagement. Thereupon the locking screws 86 are firmly tightened, locking the rack inserts 56 in proper position, and a positive drive chucking of the gear 90 is effected. The gear 90 has 44 teeth, which of course is two in excess of the next lower number divisible by three (the number of chuck assemblies), and it will be noted from Fig. 1 that the compensating rack inserts 56 have been shifted out of neutral position. The inserts 56, being free to float during adjustment of the master jaws, may or may not occupy the positions shown, depending on their positions when their teeth come into engagement with the gear teeth. If the chuck used had had four jaw assemblies, the inserts 56 would not have been shifted since 44 is divisible by four.

The racks 54 and 56 are of identical radial dimension from the outer faces 106, 108, thereof to the tooth pitch lines thereof, within very close tolerances, and engage the replaceable jaw shoulders 110, 112, equidistant from the axis 26, or shoulders 114, 116, equidistant from said axis. Consequently, for any setting or adjustment of the jaws, the pitch lines of the rack teeth 98, 100 are equidistant from the axis 26, and, with the distance of the shoulders 110, 112, or 114, 116, for any setting, from said axis and the aforesaid dimension of the racks 54, 56 known, the radial distance to said pitch lines can be computed by subtraction so that the jaws may be readily adjusted initially, for a given size gear, to bring said pitch lines slightly beyond said radial distance to receive and chuck the gear in minimum time, and the gear will automatically run true, that is, it will be coaxial with the face plate, for proper machining operations on the gear.

With master jaws capable of say 2" radial adjustment, and the keyways 42, 44 and 46, 48 radially spaced a distance of say 2", it is possible, with the construction shown in Figs. 1 to 5, to chuck gears having a difference of 8" or less in their pitch diameters. Should it be desired to chuck a gear whose pitch diameter is such as to be incapable of being chucked by a particular installation, the replaceable jaws of that installation would be replaced by an appropriate set of replaceable jaws, and if the location of the holes for the screws 40 will not interfere, the same racks may be used, but if the location of the holes for said screws should interfere, racks of an appropriately different width, measured to the pitch line, may be used.

In some chuck jaw constructions the master and replaceable jaws have mating serrations enabling the replaceable jaws to be adjusted through a wide range of positions radially relative to the master jaws. My invention is applicable to such arrangements as may be seen in Figs. 6 to 9. In Figs. 6 to 8 the serrations 120, 122 on each master jaw 124 and replaceable jaw 126 extend normal to the direction of adjustment and in Fig. 9 the serrations 128, 130 on each master jaw 132 and replaceable jaw 134 are inclined to said direction. Aside from the difference in arrangement of serrations, these two constructions and their operation are the same, so that only one need be explained. Each master jaw 124 has side keyways 136 slidably receiving the keys 24 on the chuck face plate 12, and in its outer face has a central radially extending T-slot 138 in which nuts 140 are slidably but non-rotatably disposed, said nuts receiving bolts 142, whereby a replaceable jaw 126 is adjustably mounted on the master jaw.

The invention is useful in cases where the gear to be chucked has a number of teeth divisible by the number of jaws, inasmuch as, due to manufacturing tolerances, gear teeth are not always absolutely perfect. By providing compensating racks, inaccuracies in the formation of gear teeth will not preclude proper chucking of the gears.

The description thus far has concerned a construction in which one of the racks is fixed. That arrangement may be preferred, but the construction could be as shown in Fig. 10, where all of the racks are floatingly mounted.

The foregoing description, moreover, makes reference to the use of the rack-mounting screws to clamp the floating racks in place after they are in pitch line engagement with the gear. Inasmuch as all of the racks will be clamped against the gear pursuant to the adjustment of the several jaws toward the gear, the clamping of the floating racks by such screws may be dispensed with.

Various modifications coming within the spirit of my invention may suggest themselves to those skilled in the art, and hence I do not wish to be limited to the specific forms shown or uses mentioned, except to the extent indicated in the appended claims, which are to be interpreted as broadly as the state of the art will permit.

I claim:

1. A gear chuck comprising a jaw support, a plurality of jaws mounted on said support and radially adjustable relative thereto, a rectilinear rack associated with and extending normal to the direction of radial adjustment of each jaw, said racks having the same gear tooth form, means securing one of said racks to one of said jaws, and slidably interengaged rectilinear means on the remainder of said jaws and racks and extending normal to the radial adjustment of said remainder of said jaws, whereby a gear having the same tooth form as said racks and a number of teeth other than a multiple of the number of said jaws will, by cam action between its teeth and the teeth of said remainder of said racks pursuant to adjustment of said jaws, slidably shift said remainder of said racks until the teeth of the gear at its pitch circle are in contact with teeth of all of said racks at their pitch lines on opposite sides of the radii of adjustment of said jaws.

2. A gear chuck comprising a jaw support, a plurality of jaws mounted on said support and radially adjustable relative thereto, a rectilinear rack associated with and extending normal to the direction of radial adjustment of each jaw, said racks having the same gear tooth form, means securing one of said racks to one of said jaws, and slidably interengaged rectilinear means on the remainder of said jaws and racks and extending normal to the radial adjustment of the associated jaws, whereby a gear having the same tooth form as said racks and a number of teeth other than a multiple of the number of jaws will, by cam action between its teeth and the teeth of said remainder of said racks pursuant to adjustment of said jaws, shift said remainder of said racks until the teeth of the gear at its pitch circle are in contact with the teeth of said racks at their pitch lines on opposite sides of the radii of adjustment of said jaws.

3. A positive drive gear chuck comprising a jaw support, a plurality of radially adjustable jaw means mounted on said support, rectilinear rack means for each jaw means, means fixing one of said rack means to one of said jaw means, slidably interengaged rectilinear means on the other rack means and the other jaw means and extending normal to the radial adjustment of said other jaw means, the tooth form of said rack means being identical with the tooth form of the basic rack used in generating the teeth of the gears to be chucked, whereby, when a gear to be chucked has a number of teeth other than a multiple of the number of said jaw means, the gear teeth will engage and cam the teeth of the shiftable rack means pursuant to adjustment of said jaw means and thereby shift the shiftable rack means to enable the shiftable rack means teeth to have pitch line engagement with the gear teeth at the pitch circle thereof on opposite sides of each radius of adjustment of said jaw means, and means anchoring said other rack means to said other jaw means and operative to secure said other rack means against shifting relative to said other jaw means.

4. In a positive drive gear chuck, a replaceable jaw having an axis along which it is adapted to be adjusted radially on a gear chuck face plate and having a rectilinear keyway normal to said axis, a rectilinear rack in said keyway, and means securing said rack in said keyway, said securing means comprising a member connected to said jaw and having a lost motion association with said rack to allow said rack to float parallel to said keyway.

5. In a positive drive gear chuck, a replaceable jaw having an axis along which it is adapted to be adjusted radially on a gear chuck face plate and having a rectilinear keyway normal to said axis, a rectilinear rack in said keyway, and means securing said rack in said keyway, said securing means comprising an adjustable member connected to said jaw and having a lost motion association with said rack in one adjustment thereof to allow said rack to float parallel to said keyway and adapted in another adjustment thereof to hold said rack immovable relative to said jaw.

6. In a positive drive gear chuck, a replaceable jaw having an axis along which it is adapted to be adjusted radially on a gear chuck face plate and having a rectilinear keyway normal to said axis, a rectilinear rack in said keyway, and means securing said rack in said keyway and comprising a headed screw threaded to said jaw, said rack having a slot parallel to said keyway, said screw passing through said slot and, in one adjustment, affording lost motion between said screw and said rack to allow said rack to float parallel to said keyway and adapted, in another adjustment, by virtue of engagement of the head of said screw with said rack, to hold said rack immovable relative to said jaw.

7. A gear chuck comprising a jaw support, a plurality of jaws mounted on said support and radially adjustable relative thereto, a rectilinear rack associated with and extending normal to the direction of radial adjustment of each jaw, said racks having the same gear tooth form, means on each jaw for accommodating the associated rack selectively in radially spaced positions, means for anchoring each rack selectively in either of said positions, and slidably interengaged rectilinear means on certain of said jaws and racks and extending normal to the radial adjustment of their associated jaws, respectively, whereby a gear of the same tooth form as said racks and having a number of teeth other than a multiple of the number of said jaws will, by cam action between its teeth and the teeth of said slidable racks pursuant to adjustment of said jaws, shift said slidable racks until the teeth of the gear at its pitch circle are in contact with teeth of all of said racks at their pitch lines and on opposite sides of each of the radii of adjustment of said jaws, each jaw being adjustable radially through a distance at least substantially equal to the radial distance between said positions, so that the range of gear diameters which can be accommodated by said chuck is such that the smallest differs from the largest by not less than substantially four times said radial distance.

8. A gear chuck comprising a support, jaw means mounted on said support and radially adjustable thereon, rectilinear gear-engaging rack means of the same gear tooth form, said jaw means and rack means having slidably interengaged rectilinear tongue-and-groove means extending normal to the radial adjustment of said jaw means, means anchoring said rack means to said jaw means and limiting the sliding movement of said rack means relative to said jaw means, said anchoring means including adjustable means operative to secure said rack means in selected positions relative to said jaw means, and additional jaw means mounted on said support and radially adjustable thereon and having additional rectilinear gear-engaging rack means extending normal to the direction of radial adjustment of said additional jaw means.

9. A gear chuck comprising a support, jaw means mounted on said support and radially adjustable thereon, rectilinear gear-engaging rack means of the same gear tooth form, said jaw means and rack means having slidably interengaged rectilinear tongue-and-groove means extending normal to the radial adjustment of said jaw means, means anchoring said rack means to said jaw means and limiting the sliding movement of said rack means relative to said jaw means, and additional jaw means mounted on said support and radially adjustable thereon and having additional rectilinear gear-engaging rack means extending normal to the direction of radial adjustment of said additional jaw means.

10. A gear chuck comprising a support, jaw means mounted on said support and radially adjustable thereon, rectilinear gear-engaging rack means of the same gear tooth form, said jaw means and rack means having slidably interengaged rectilinear tongue-and-groove means extending normal to the radial adjustment of said jaw means, and means anchoring said rack means to said jaw means and limiting the sliding movement of said rack means relative to said jaw means.

11. A gear chuck comprising a support, jaws mounted on said support and radially adjustable thereon, each jaw having a gear-engaging rack whose pitch line is straight and normal to the radius along which the associated jaw is adjustable, said racks being of the same tooth form, means fixing one of said racks relative to the associated jaw, the remainder of said jaws and racks having slidably inter-engaged rectilinear tongue-and-groove means normal to the radial adjustment of said remainder of said jaws, and means for anchoring the slidable racks in selected positions relative to the associated jaws.

12. A gear chuck comprising a support, jaws mounted on said support and radially adjustable thereon, rectilinear racks of the same gear tooth form carried by said jaws and extending normal to the direction of radial adjustment of the respective jaws and engageable between teeth of gears of the same tooth form and of different diameters to be chucked, each jaw and associated rack having slidably interengaged rectilinear tongue-and-groove means normal to the radius along which the jaw carrying the same is adjustable, and means limiting the extent of sliding movement of said racks relative to the respective jaws.

ARTHUR MACKMANN.

REFERENCES CITED

The following references are of record in the file of this patent:

UNITED STATES PATENTS

| Number | Name | Date |
|---|---|---|
| 1,058,237 | Heald | Apr. 8, 1913 |
| 1,389,974 | Olin | Sept. 6, 1921 |
| 2,401,971 | Schuster | June 11, 1946 |